US010432604B2

(12) United States Patent
Kolluru et al.

(10) Patent No.: US 10,432,604 B2
(45) Date of Patent: *Oct. 1, 2019

(54) SYSTEM AND METHOD FOR POOL-BASED IDENTITY AUTHENTICATION FOR SERVICE ACCESS WITHOUT USE OF STORED CREDENTIALS

(71) Applicant: eBay Inc., San Jose, CA (US)

(72) Inventors: Raju Venkata Kolluru, San Jose, CA (US); Michael Dean Kleinpeter, San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/123,107

(22) Filed: Sep. 6, 2018

(65) Prior Publication Data

US 2019/0081939 A1 Mar. 14, 2019

Related U.S. Application Data

(63) Continuation of application No. 15/815,270, filed on Nov. 16, 2017, now Pat. No. 10,091,182, which is a continuation of application No. 15/091,712, filed on Apr. 6, 2016, now Pat. No. 9,853,961, which is a continuation of application No. 14/290,823, filed on May 29, 2014, now Pat. No. 9,319,394, which is a continuation of application No. 13/408,611, filed on Feb. 29, 2012, now Pat. No. 8,745,700, which is a
(Continued)

(51) Int. Cl.
*H04L 29/06* (2006.01)
*H04L 9/32* (2006.01)

(52) U.S. Cl.
CPC ............ *H04L 63/08* (2013.01); *H04L 9/321* (2013.01); *H04L 63/0823* (2013.01); *H04L 63/10* (2013.01)

(58) Field of Classification Search
None
See application file for complete search history.

(56) References Cited

U.S. PATENT DOCUMENTS 5,706,427 A 1/1998 Tabuki
5,841,970 A 11/1998 Tabuki
(Continued)

OTHER PUBLICATIONS

"U.S. Appl. No. 12/119,684, Non Final Office Action dated Apr. 5, 2011", 8 pgs.
(Continued)

*Primary Examiner* — Christopher A Revak
(74) *Attorney, Agent, or Firm* — Schwegman Lundberg & Woessner, P.A.

(57) ABSTRACT

A computer-implemented system and method for pool-based identity authentication for service access without use of stored credentials is disclosed. The method in an example embodiment includes providing provisioning information for storage in a provisioning repository; receiving a service request from a service consumer, the service request including requestor identifying information; generating an authentication request to send to an authentication authority, the authentication request including requestor identifying information; receiving validation of an authenticated service request from the authentication authority; and providing the requested service to the service consumer.

20 Claims, 5 Drawing Sheets

Related U.S. Application Data continuation of application No. 12/119,684, filed on May 13, 2008, now Pat. No. 8,132,238.

(56) References Cited

U.S. PATENT DOCUMENTS

| | | | |
|---|---|---|---|
| 5,987,232 | A | 11/1999 | Tabuki |
| 6,049,877 | A | 4/2000 | White |
| 7,519,596 | B2 | 4/2009 | Iyer et al. |
| 7,562,382 | B2 | 7/2009 | Hinton et al. |
| 7,636,941 | B2 | 12/2009 | Blinn et al. |
| 7,721,322 | B2 | 5/2010 | Sastry et al. |
| 7,870,389 | B1 | 1/2011 | Leung et al. |
| 7,912,971 | B1 | 3/2011 | Dunn |
| 7,979,896 | B2 | 7/2011 | Mcmurtry et al. |
| 8,132,238 | B2 | 3/2012 | Kolluru et al. |
| 8,291,077 | B2 | 10/2012 | I'anson |
| 8,447,829 | B1 | 5/2013 | Geller |
| 8,656,472 | B2 | 2/2014 | Mcmurtry et al. |
| 8,745,700 | B2 | 6/2014 | Kolluru et al. |
| 8,893,242 | B2 | 11/2014 | Kolluru et al. |
| 8,951,554 | B2 * | 2/2015 | Park ............ A61K 8/11 424/451 |
| 8,996,482 | B1 | 3/2015 | Singh et al. |
| 9,172,541 | B2 | 10/2015 | Kolluru et al. |
| 9,319,394 | B2 | 4/2016 | Kolluru et al. |
| 9,672,499 | B2 * | 6/2017 | Yang ............ G06Q 20/3678 |
| 9,853,961 | B2 | 12/2017 | Kolluru et al. |
| 10,091,182 | B2 | 10/2018 | Kolluru et al. |
| 2002/0026427 | A1 | 2/2002 | Kon et al. |
| 2004/0221045 | A1 | 11/2004 | Joosten et al. |
| 2005/0223109 | A1 | 10/2005 | Mamou et al. |
| 2007/0011126 | A1 | 1/2007 | Conner et al. |
| 2007/0271618 | A1 | 11/2007 | Chao et al. |
| 2008/0141339 | A1 | 6/2008 | Gomez et al. |
| 2009/0077618 | A1 | 3/2009 | Pearce et al. |
| 2009/0288149 | A1 | 11/2009 | Kolluru et al. |
| 2012/0159585 | A1 | 6/2012 | Kolluru et al. |
| 2014/0282980 | A1 | 9/2014 | Kolluru et al. |
| 2014/0359746 | A1 | 12/2014 | Tezuka et al. |
| 2016/0226851 | A1 | 8/2016 | Kolluru et al. |
| 2018/0083945 | A1 | 3/2018 | Kolluru et al. |

OTHER PUBLICATIONS

"U.S. Appl. No. 12/119,684, Response filed Aug. 5, 2011 to Non Final Office Action dated Apr. 5, 2011", 10 pgs.

"U.S. Appl. No. 12/119,684, Notice of Allowance dated Oct. 28, 2011", 6 pgs.

"U.S. Appl. No. 13/408,611, Non Final Office Action dated Mar. 4, 2013", 10 pgs.

"U.S. Appl. No. 13/408,611, Response filed Jun. 18, 2013 to Non Final Office Action dated Mar. 4, 2013", 12 pgs.

"U.S. Appl. No. 13/408,611, Non Final Office Action dated Sep. 6, 2013", 5 pgs.

"U.S. Appl. No. 13/408,611; Response filed Jan. 6, 2014 to Non-Final Office Action dated Sep. 6, 2013", 10 pgs.

"U.S. Appl. No. 13/408,611, Notice of Allowance dated Jan. 27, 2014", 5 pgs.

"U.S. Appl. No. 14/290,823, Preliminary Amendment filed Jun. 11, 2014", 5 pgs.

"U.S. Appl. No. 14/290,823, Non Final Office Action dated May 21, 2015", 12 pgs.

"U.S. Appl. No. 14/290,823, Response filed Aug. 21, 2015 to Non Final Office Action dated May 21, 2015", 15 pgs.

"U.S. Appl. No. 14/290,823, Notice of Allowance dated Nov. 2, 2015", 6 pgs.

"U.S. Appl. No. 14/290,823, Corrected Notice of Allowance dated Nov. 20, 2015", 2 pgs.

"U.S. Appl. No. 14/290,823, PTO Response to Rule 312 Communication dated Mar. 4, 2016", 2 pgs.

"U.S. Appl. No. 14/290,823, Corrected Notice of Allowance dated Mar. 24, 2016", 10 pgs.

"U.S. Appl. No. 15/091,712, Preliminary Amendment filed May 10, 2016", 7 pgs.

"U.S. Appl. No. 15/091,712, Non Final Office Action dated May 12, 2017", 8 pgs.

"U.S. Appl. No. 15/091,712, Response filed Aug. 7, 2017 to Non Final Office Action dated May 12, 2017", 8 pgs.

"U.S. Appl. No. 15/091,712, Notice of Allowance dated Aug. 24, 2017", 8 pgs.

"U.S. Appl. No. 15/815,270, Preliminary Amendment filed Jan. 2, 2018", 7 pgs.

"U.S. Appl. No. 14/290,823, 312 Amendment filed Jan. 29, 2016", 8 pgs.

"U.S. Appl. No. 15/815,270, First Action Interview—Pre-Interview Communication dated Feb. 28, 2018", 4 pgs.

"U.S. Appl. No. 15/815,270, Notice of Allowance dated May 31, 2018", 5 pgs.

"Response to First Action Interview—Pre Interview Communication filed on Mar. 28, 2018 for U.S. Appl. No. 15/815,270, dated Feb. 28, 2018", (Mar. 28, 2018), 1 page.

* cited by examiner

SYSTEM AND METHOD FOR POOL-BASED IDENTITY AUTHENTICATION FOR SERVICE ACCESS WITHOUT USE OF STORED CREDENTIALS

CROSS-REFERENCE TO RELATED APPLICATIONS

This application is a continuation of U.S. patent application Ser. No. 15/815,270, filed Nov. 16, 2017, which is a continuation of U.S. patent application Ser. No. 15/091,712 filed Apr. 6, 2016, which is a continuation of U.S. patent application Ser. No. 14/290,823 filed May 29, 2014, now U.S. Pat. No. 9,319,394, which is a continuation of U.S. patent application Ser. No. 13/408,611 filed Feb. 29, 2012, now U.S. Pat. No. 8,745,700, which is a continuation of U.S. patent application Ser. No. 12/119,684 filed May 13, 2008, now U.S. Pat. No. 8,132,238, the benefit of priority of each of which is claimed hereby, and each of which are incorporated by reference herein in their entirety.

BACKGROUND

Copyright Notice

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006-2008, eBay Inc., All Rights Reserved.

Technical Field

This disclosure relates to methods and systems supporting computing and data processing systems. More particularly, pool-based identity authentication for service access without use of stored credentials.

Related Art

In Services Oriented Architecture (SOA), there are many communicating services that are deployed in several machines. In large-scale enterprises, like eBay, eTrade, or Google for example, there could be thousands of different services deployed in thousands of machines. It is most efficient if these services are allowed to communicate with each other. If these services are allowed to communicate with each other, various types of access controls and security checks will be required. These access controls and security checks can include, for example, service authentication, service authorization, and rate limiting. :For example, a 'billing service' (caller service) can be authorized to access or call a 'rating calculator service' (callee service), while an 'about me service' will not be so authorized.

For the security checks described above, the callee service needs to be able to identify the caller service. For example, the 'rating calculator service' (callee service) needs to be able to identify the 'billing service' (caller service) prior to enabling access to the callee service. Human users can be easily authenticated by prompting for a password, for example. However, the same mechanisms used for identifying and authenticating human users cannot be used for identifying and authenticating computer-implemented services or software processes or applications. Services and/or applications cannot use password identification/authentication, such as by retrieving a password from disk storage; because, the passwords can be easily stolen and used for unauthorized purposes. In other words, passwords represent an example of undesirable portable credentials that cannot be used safely for identification/authentication of computer-implemented services or software processes or applications. Conventional identification/authentication mechanisms do not support a mechanism for providing identification/authentication of computer-implemented services or software processes or applications without using risky credentials stored on disk.

U.S. Patent Application No, 2005/0223109 describes a system wherein services such as product services, real-time services, and common services are deployed in a services oriented architecture. These services may, for example, be deployed for use in a variety of enterprise data integration functions.

U.S. Patent Application No, 2007/0011126 describes a service-oriented architecture (SOA) and accompanying method. In one embodiment, the SOA includes one or more service requesters coupled to one or more service providers via a bus. The bus includes runtime-binding functionality to facilitate interaction between the one or more service requesters and the one or more service providers. A registry, which stores information pertaining to a service provided by the one or more service providers, communicates with one or more service providers and/or requesters and the bus. In a more specific embodiment, bus includes a Service-Integration Bus (SIB) that includes a Service-Factory (SF) module for facilitating implementing the runtime binding functionality and for selectively invoking the service. Functionality of the SOA is strategically organized into various tiers and layers, including a requester tier, a provider tier, a business-process services tier, an infrastructure-services tier, an SIB layer, a persistence layer, and so on.

Thus, a computer-implemented system and method for pool-based identity authentication for service access without use of stored credentials are needed.

BRIEF DESCRIPTION OF THE DRAWINGS

Embodiments illustrated by way of example and not limitation in the figures of the accompanying drawings, in which.

DETAILED DESCRIPTION

Figure 1:
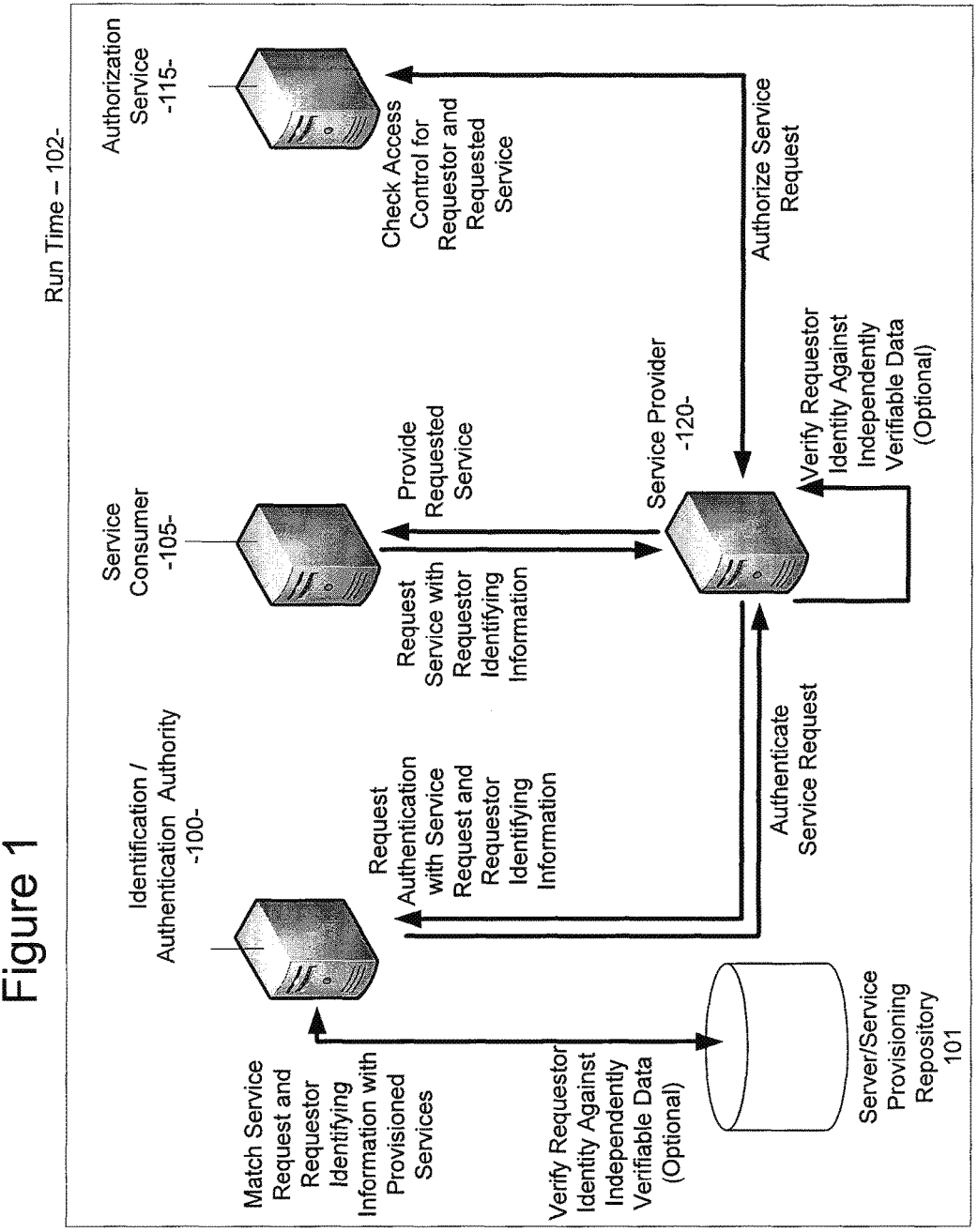
FIG. 1 illustrates an example embodiment of a computer-implemented system for pool-based authentication for service access without use of stored credentials.

In the following description, for purposes of explanation, numerous specific details are set forth in order to provide a thorough understanding of some example embodiments. It will be evident, however, to one of ordinary skill in the art that the present invention may be practiced without these specific details.

As described further below, according to various example embodiments of the disclosed subject matter described and claimed herein, there is provided a computer-implemented system and method for pool-based identity authentication for service access without use of stored credentials. Various embodiments are described below in connection with the figures provided herein.

In particular embodiments, an identification/authentication authority is provided to compare and match service requests and requestor identifying information with provisioned services deployed on target machines. Authentication can be based on the real-time deployment configuration information stored in a provisioning repository in combination with other independently verifiable data and tests performed on the provisioning information and independently verifiable data. As such, in the various embodiments described herein, authentication does not need to be based on a stored credential or certificate, Stored credentials are subject to being compromised and/or illegitimately accessed or used by unauthorized parties. Thus, the various embodiments described herein avoid the use of these risky stored credentials. Without stored credentials, the system of the various embodiments described herein is very flexible. Because there is no key deployment step involved in these various embodiments, the system described herein provides the ability to quickly deploy services or quickly reconfigure a deployment system. "Key deployment" in conventional systems is usually very slow and error-prone. In dynamic deployments, such as grid environments, "key deployment" can become a bottleneck. Further, some conventional computer services/applications prompt a user for the entry of passwords during system startup instead of using stored credentials. However, this is not a scalable solution, as it becomes inefficient when the number of applications exceeds a relatively small threshold. In the various embodiments described herein, the inventive system does not use a stored credential and does not prompt for passwords during start-ups. Hence, the inventive system avoids the use of risky stored credentials and does not need any administrator support to enter passwords during startup.

One example of the independently verifiable data used in various embodiments is an Internet Protocol (IP) address of an application server or a computing system acting as a service consumer. The IP address can be independently verified from the TCP socket header as the raw socket packet structure contains the remote IP address. Additionally, the IP address can be independently verified by extracting the x-Forwarded HTTP (Hypertext Transfer Protocol) value inserted by a virtual IP address forwarding processor. Service requests can be authenticated by the identification/authentication authority server upon successful completion of the tests on the provisioning information and independently verifiable data. The provisioning information stored in the server/service provisioning repository can be trusted given the creation and management of the provisioning information is handled by a secure provisioning system.

Referring to FIG. 1, a diagram illustrates an example embodiment of a computer-implemented system for pool-based authentication for service access without use of stored credentials. During a build time or initial system/service deployment time, a secure provisioning system can be used to create and maintain provisioning information in server/service provisioning repository 101. A secure provisioning/deployment tool, such as OPSWARE or TIVOLI PROVISIONING MANAGER, can be used to perform the initial system/service deployment and generation of the provisioning information stored in the server/service provisioning repository 101. Various embodiments for using this provisioning information to authenticate service requests and service requestors are described in more detail below.

In a particular embodiment, a well-known protocol, such as the security assertion markup language (SAML), can be used for communication among the various components of the system. Conventional SAML is an XML (Extensible Markup Language) standard for exchanging authentication and authorization data between security domains, that is, between a service authenticator (e.g. a producer of assertions) and a service provider (e.g. a consumer of assertions). SAML is a product of the OASIS Security Services Technical Committee. It will be apparent those of ordinary skill in the art that other protocols may be used with various embodiments.

The single most important problem that SAML is trying to solve is the Web Browser Single Sign-On (SSO) problem. Single sign-on solutions are abundant at the intranet level (using cookies, for example); but, extending these solutions beyond the intranet has been problematic and has led to the proliferation of non-interoperable proprietary technologies. SAML has become a standard underlying many web Single Sign-On solutions in the enterprise identity management problem space. However, SAML does not specify the implementation of local authentication services; indeed, SAML does not care how local authentication services are implemented (although individual service providers most certainly will). A service provider relies on an authentication authority 100 to authenticate the service consumer as will be described in more detail below.

Referring again to FIG. 1, the provisioning information generated by the provisioning system at initial system/service deployment time can be stored in server/service provisioning repository 101 and made accessible to authentication authority 100 in a secure manner. Once this provisioning information is resident in server/service provisioning repository 101, a run time mode 102 can be initiated to enable the service consumers 105 to access and use a plurality of service providers 120 for the particular processing needs of the service consumers 105.

As well known to those of ordinary skill in the art, an authorization service (e.g. a role-based access control system or RBAC server) 115 can be configured to specifically grant or deny access to and/or use of particular services provided by the service providers 120 to particular service consumers 105. In this manner, a properly authenticated service consumer 105 can be granted or denied access to particular services of service providers 120 based on the configured information in authorization service 115. However, the service authorization provided by the authorization service 115 assumes that the authentication/identity of the requesting service consumer has already been verified. This service consumer 105 authentication verification stage is a focus of a particular embodiment as described in more detail below.

Referring still to FIG. 1, once the provisioning information generated by the provisioning system at initial system/service deployment time is stored in server/service provisioning repository 101 and a system run time mode 102. is initiated, each service consumer 105 can thereafter begin to request the use of various services provided by the service providers 120. However, prior to being granted access to the services provided by the service providers 120, the service providers 120 may authenticate the service and service requester identifying information using authentication authority 100. The authentication authority 100 is a processing entity that is trusted by the service providers 120. As such, a service consumer 105 validated by the authentication authority 100 can obtain access to or use of a requested service, assuming such service access or use is authorized by the authorization service 115. Therefore, in a particular embodiment, service consumers 105 do not need to directly access the authentication authority 100 or the authorization service 115 prior to requesting a service from a service provider 120.

During a system run time mode 102, a service consumer 105 can request access to or use of one or more of the services provided by the service providers 120. When a service consumer 105 wishes to use a service of service providers 120, the service consumer 105 makes a request for the service. The service request is a network data transmission that includes identifying information associated with the requesting service consumer 105 as obtained from various sources. For example, the service consumer 105 can supply its IP address or other identifying information that can be independently verified as described above. The service request can also include a name, code, or identifier of the service being requested. The service request with requestor identifying information can be conveyed to the particular service provider 120 as shown in FIG. 1. A SAML communication can be used for this service request.

When the service provider 120 receives a request for service with requestor identifying information from a service consumer 105, the service provider 120 can respond in various ways. First, the service provider 120 can check the requested service and requestor identity and immediately grant access to the requested service if the requested service has been configured with no authentication or authorization restrictions. Secondly and optionally, the service provider 120 can validate the service request and requestor by verifying the content of the service request against independently verifiable data. As described above, the independently verifiable data can include an Internet Protocol (IP) address of the service consumer 105. Thus, the service consumer 105 IP address, name, attributes, or other identifying information that was included in the service request can be validated by the service provider 120 once the service provider 120 obtains the independently verifiable data and matches the data with the corresponding data in the service request of the service consumer 105. If the service provider 120 is able to match the independently verifiable data with the corresponding data in the service request of the service consumer 105, the service provider 120 can optionally accept the identity of the service consumer 105.

In another example embodiment used for services configured with some level of authentication restrictions, the service provider 120 can use the authentication authority 100 to validate the authenticity/identity of the service request and requestor. In this embodiment, when the service provider 120 receives a service request from a service consumer 105, the service provider 120 can request authentication of the service request and requestor from the authentication authority 100. Because the service provider 120 trusts the authentication authority 100 to properly validate the identity of the service consumer 105, the service provider 120 may accept the validated identity of the requesting service consumer 105, given such validation from the authentication authority 100.

As shown in FIG. 1, service provider 120 requests authentication of a service request and requestor by sending an authentication request to the authentication authority 100. The authentication request can include the identifier of the requested service and the requestor identifying information as conveyed to the service provider 120 in the service request from the service consumer 105. The authentication authority 100 can receive the authentication request from the service provider 120 and access corresponding provisioning information in the server/service provisioning information repository 101. The corresponding provisioning information in repository 101 can include the requestor identifying information provisioned for the corresponding service consumer 105. For example, the requestor identifying information provisioned for the corresponding service consumer 105 can include the IP address expected for the particular service consumer 105. This provisioned information corresponding to the requesting service consumer 105 can be compared to the requestor identifying information provided to the authentication authority 100 by the service provider 120 in the authentication request. If the service request and requestor identifying information received by the authentication authority 100 from the service consumer 105 via the service provider 120 matches the requestor identifying information provisioned for the corresponding service consumer 105 in the repository 101, the authentication authority 100 can authenticate the service request by sending a service request authentication validation message to the service provider 120. Otherwise, the authentication authority can send a message to the service provider 120 indicating that authentication of the corresponding service request failed.

Optionally, the authentication authority 100 can also validate the service request and requestor by verifying the content of the service request against independently verifiable data. As described above, the independently verifiable data can include an Internet Protocol (IP) address of the service consumer 105. Thus, the service consumer 105 IP address, name, attributes, or other identifying information that was included in the authentication request can be validated by the authentication authority 100 once the authentication authority 100 obtains the independently verifiable data and matches the data with the corresponding data in the authentication request of the service provider 120. If the authentication authority 100 is able to match the independently verifiable data with the corresponding data in the authentication request of the service provider 120, the authentication authority 100 can validate the identity of the service consumer 105.

Referring still to FIG. 1, once the identity of the service consumer 105 is verified/authenticated by the authentication authority 100 and a validation message is sent to the service provider 120 as described above, the service provider 120 may access the authorization service 115 to check the access controls previously configured for the service consumer 105 with regard to the requested service. If the requesting service consumer 105 is authorized to access or use the requested service as determined using the authorization service 115, the service provider 120 can grant access or use of the requested service to the requesting service consumer 105. Thereafter, the requested service and related data is provided to the requesting service consumer 105. Using a similar process as described above, the service consumer 105 can access and/or use any of the authorized services provided by the service providers 120. In each request for service, the service consumer 105 does not need to access the authentication authority 100 directly to validate the identity of the service consumer 105. Rather, because of the novel configuration and processing of a particular embodiment, the service providers 120 can trust the authentication authority 100 to validate the identity of the service consumers 105 using provisioning information. Further, the authentication authority 100 can trust the provisioning system to generate valid provisioning information for the service consumers 105 as stored in repository 101.

Figure 2:
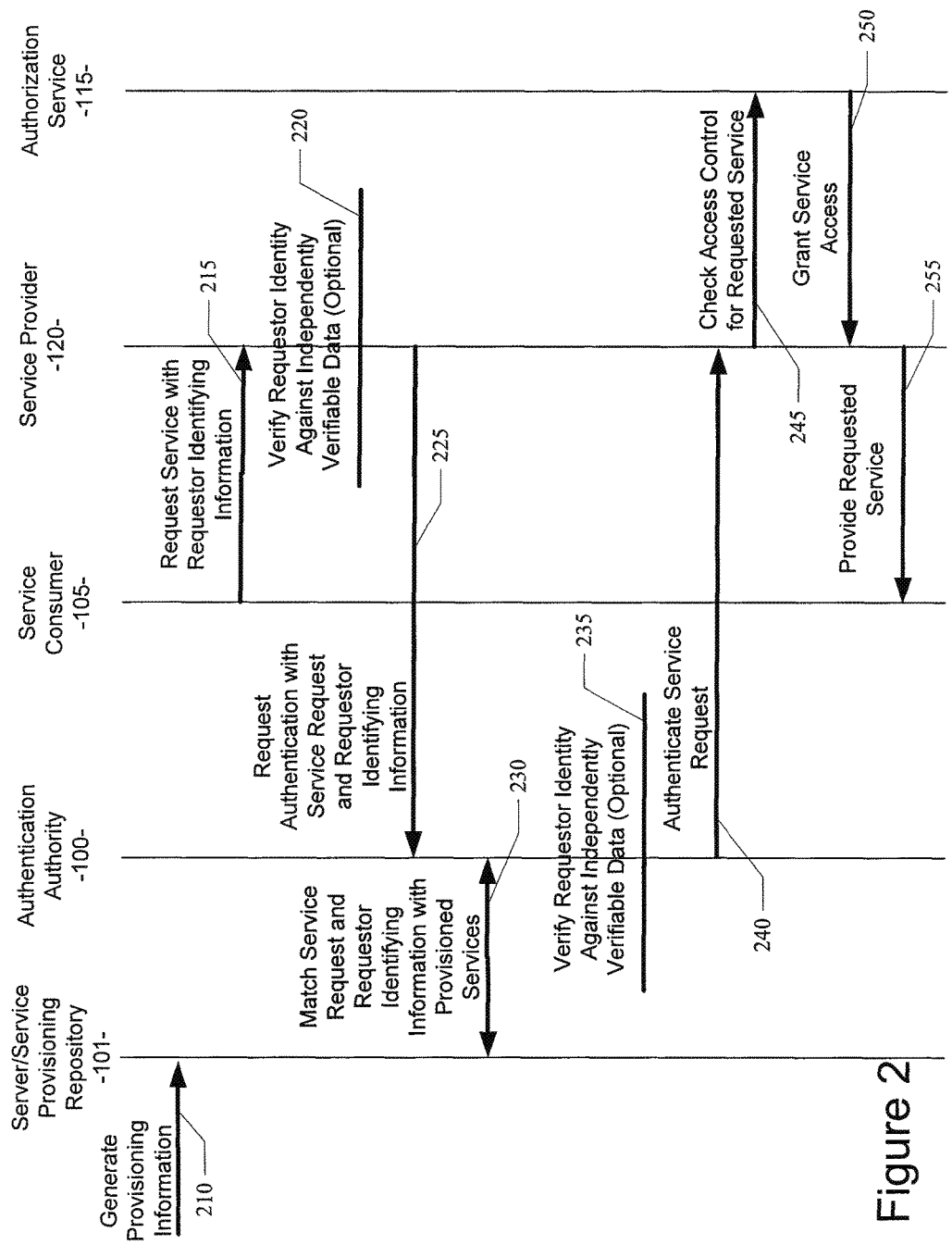
FIG. 2 is an event diagram showing a sequence of operations in one example embodiment.

FIG. 2 is an event diagram showing a sequence of operations in one example embodiment. In a first operation 210 of the example embodiment shown in FIG. 2, the provisioning system generates provisioning information and stores the provisioning information in the server/service provisioning repository 101. This operation typically occurs at initial system/service deployment time. In the next operation 215 of the example embodiment, the service consumer 105 can request one or more services from a service provider 120 in operations performed during system run time 102. In this operation, the service consumer 105 generates a service request including an identifier of a desired service and information identifying the service requester (i.e. the requesting service consumer 105). In the next optional operation 220 of the example embodiment, the service provider 120 can optionally validate the service request and requestor by verifying the content of the service request against independently verifiable data. As described above, the independently verifiable data can include an Internet Protocol (IP) address of the service consumer 105. Thus, the service consumer 105 IP address, name, attributes, or other identifying information that was included in the service request can be validated by the service provider 120 once the service provider 120 obtains the independently verifiable data and matches the data with the corresponding data in the service request of the service consumer 105. If the service provider 120 is able to match the independently verifiable data with the corresponding data in the service request of the service consumer 105, the service provider 120 can optionally accept the identity of the service consumer 105.

In the next operation 225 of the example embodiment, the service provider 120 can send an authentication request to the authentication authority 100. The service provider 120 uses the authentication authority 100 to validate the authentication of the service request and requestor. In this embodiment, when the service provider 120 receives a service request from a service consumer 105, the service provider 120 can request authentication of the service request and requestor from the authentication authority 100. Because the service provider 120 trusts the authentication authority 100 to properly validate the identity of the service consumer 105, the service provider 120 may accept the validated identity of the requesting service consumer 105, given such validation received from the authentication authority 100.

In the next operation 230 of the example embodiment, the authentication authority 100 can receive the authentication request from the service provider 120 and access corresponding provisioning information in the server/service provisioning information repository 101. The corresponding provisioning information in repository 101 can include the requestor identifying information provisioned for the corresponding service consumer 105. For example, the requestor identifying information provisioned for the corresponding service consumer 105 can include the IP address expected for the service consumer 105. This provisioned information corresponding to the requesting service consumer 105 can be compared to the requestor identifying information provided to the authentication authority 100 by the service provider 120 in the authentication request. If the service request and requestor identifying information received by the authentication authority 100 from the service consumer 105 via the service provider 120 matches the requestor identifying information provisioned for the corresponding service consumer 105 in the repository 101, the authentication authority 100 can authenticate the service request by sending a service request authentication validation message to the service provider 120 in operation 240 shown in FIG. 2. Otherwise, the authentication authority can send a message to the service provider 120 indicating that authentication of the corresponding service request failed.

Optionally, in operation 235 of a particular embodiment, the authentication authority 100 can also validate the service request and requestor by verifying the content of the service request against independently verifiable data. As described above, the independently verifiable data can include an Internet Protocol (IP) address of the service consumer 105. Thus, the service consumer 105 IP address, name, attributes, or other identifying information that was included in the authentication request can be validated by the authentication authority 100 once the authentication authority 100 obtains the independently verifiable data and matches the data with the corresponding data in the authentication request of the service provider 120. If the authentication authority 100 is able to match the independently verifiable data with the corresponding data in the authentication request of the service provider 120, the authentication authority 100 can validate the identity of the service consumer 105.

Referring still to FIG. 2, once the identity of the service consumer 105 is verified/authenticated by the authentication authority 100 and a validation message is communicated to the service provider 120 as described above, the service provider 120 may access the authorization service 115 to check the access controls previously configured for the service consumer 105 with regard to the requested service, If the requesting service consumer 105 is authorized to access or use the requested service as determined using the authorization service 115, the authorization service 115 can grant service access to the service provider 120 in operation 250. Finally in operation 255, the service provider 120 can grant access or use of the requested service to the requesting service consumer 105. Thereafter, the requested service and related data is provided to the requesting service consumer 105. Using a similar process as described above, the service consumer 105 can access and/or use any of the authorized services provided by the service providers 120. In each request for service, the service consumer 105 does not need to access the authentication authority 100 directly to validate the identity of the service consumer 105. Rather, because of the novel configuration and processing of a particular embodiment, the service providers 120 can trust the authentication authority 100 to validate the identity of the service consumers 105. Further, the authentication authority 100 can trust the provisioning system to generate valid provisioning information for the service consumers 105 as stored in repository 101.

Figure 3:
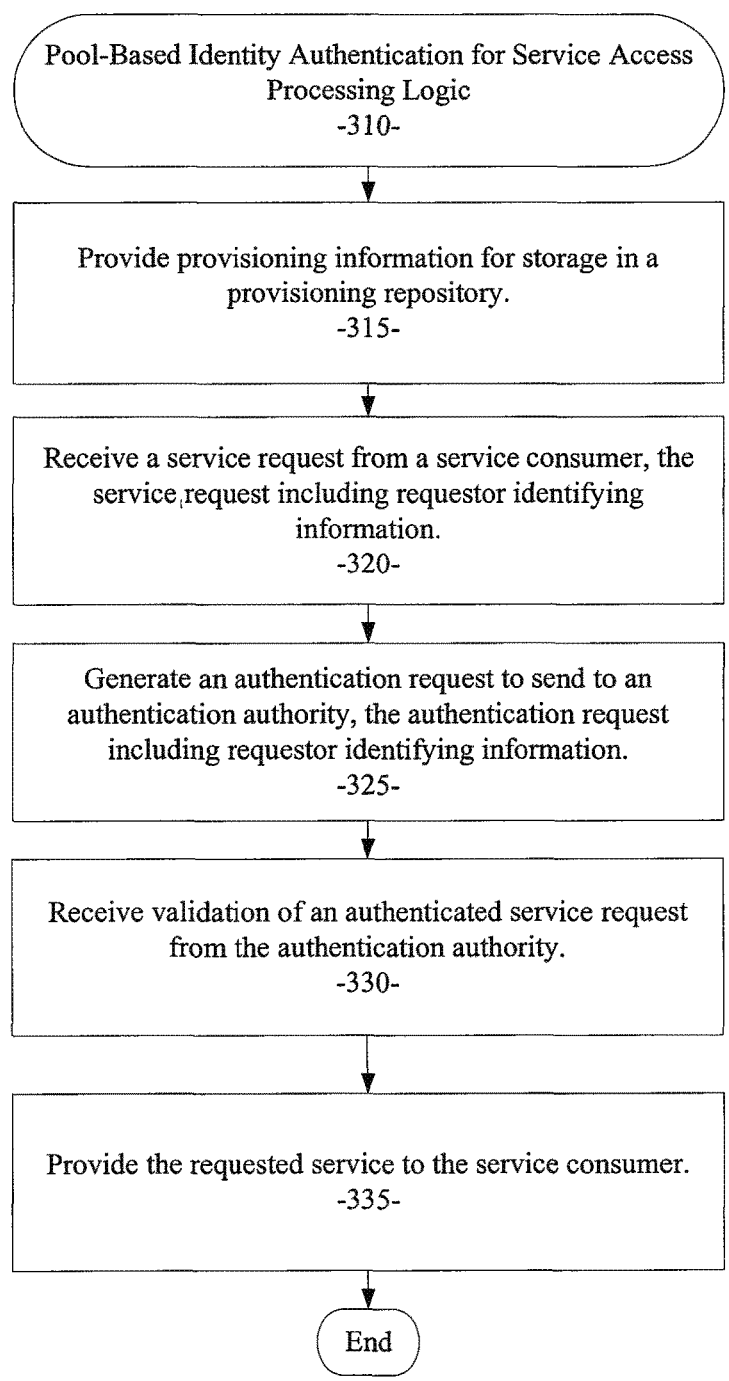
FIGS. 3-4 illustrate processing flow diagrams for various example embodiments.

FIG. 3 illustrates a processing flow diagram for an example embodiment. In the embodiment 310 shown, a pool-based identity authentication apparatus for service access performs the steps of: providing provisioning information for storage in a provisioning repository (processing block 315); receiving a service request from a service consumer, the service request including requestor identifying information (processing block 320); generating an authentication request to send to an authentication authority, the authentication request including requestor identifying information (processing block 325); receiving validation of an authenticated service request from the authentication authority (processing block 330); and providing the requested service to the service consumer (processing block 335).

Figure 4:
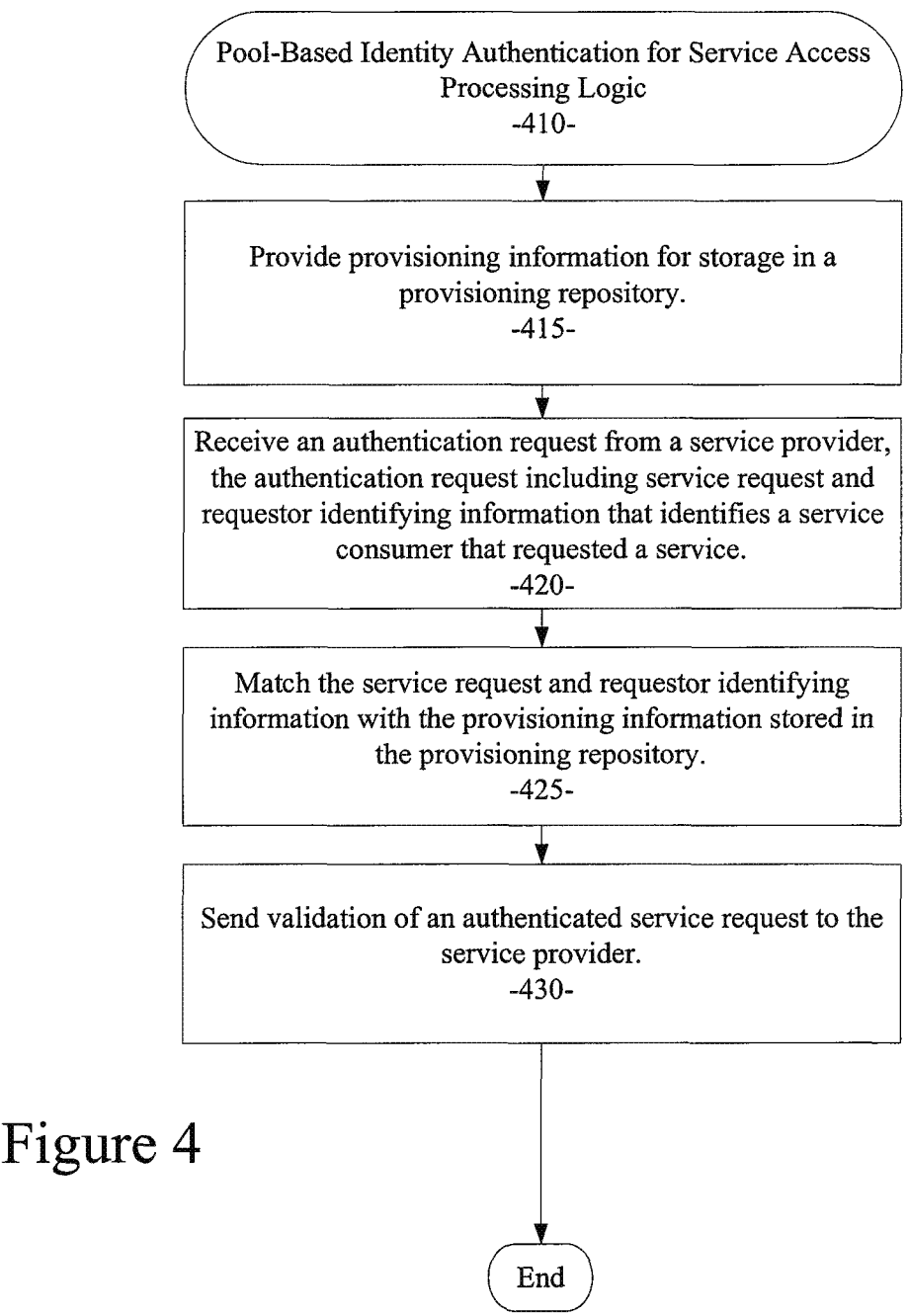

FIG. 4 illustrates a processing flow diagram for another example embodiment. In the embodiment 410 shown, a pool-based identity authentication apparatus for service access performs the steps of: providing provisioning information for storage in a provisioning repository (processing block 415); receiving an authentication request from a service provider, the authentication request including service request and requestor identifying information that identifies a service consumer that requested a service (processing block 420); matching the service request and requestor identifying information with the provisioning information stored in the provisioning repository (processing block 425); and sending validation of an authenticated service request to the service provider (processing block 430).

Figure 5:
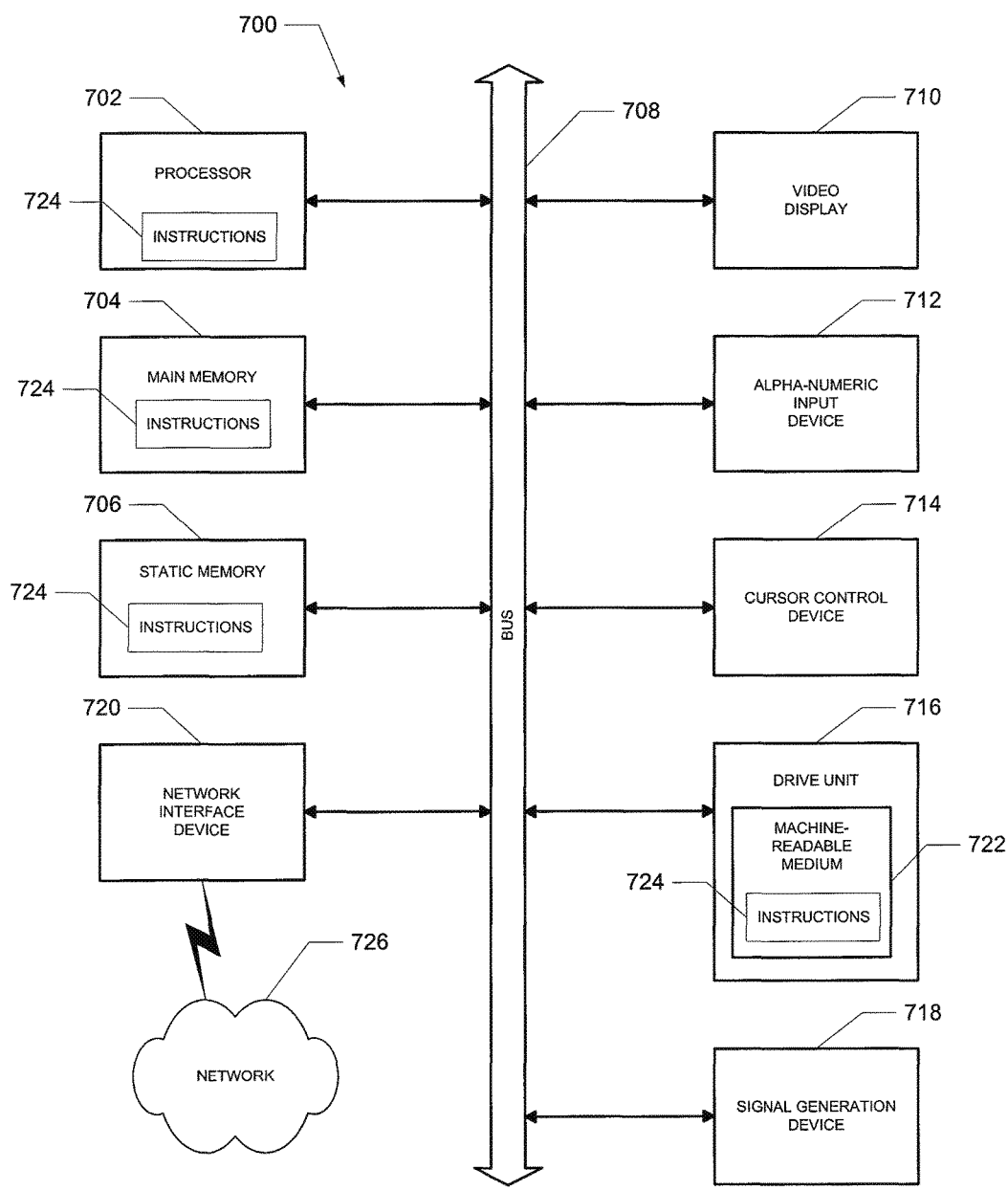
FIG. 5 shows a diagrammatic representation of a machine in the form of a computer system within which a set of instructions, for causing the machine to perform any one or more of the methodologies discussed herein, may be executed, according to an example embodiment.

FIG. 5 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 72.6 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, a computer-implemented system and method for pool-based identity authentication for service access without use of stored credentials are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A method comprising:
receiving, at an authentication authority, an authentication request from a web service provider, the authentication request comprising a service request by a service requestor to the web service provider to access a web service, and a service requestor identifying information;

determining authentication information from the service request sent to the web service, the service request comprising the authentication information;

validating the authentication information using independently verifiable data; and in response to validating the authentication information meets the independently verifiable data, sending a grant or denial of access to the web service.

2. The method of claim 1, wherein the authentication information comprises an IP address of the service request and the independently verifiable data comprises a range of IP addresses.

3. The method of claim 2, wherein the IP address of the service request is extracted from an x-Forwarded HTTP value.

4. The method of claim 1, wherein the authentication information comprises content of the service request.

5. The method of claim 1, wherein the authentication information includes an attribute of the service request.

6. The method of claim 1, further comprising performing a test on the independently verifiable data.

7. The method of claim 1, further comprising retrieving the independently verifiable data from a secure provisioning repository.

8. A system comprising:
a memory device for storing instructions; and
a processor, which, when executing the instructions, causes the system to perform operations comprising:

receiving an authentication request from a web service provider, the authentication request comprising a service request by a service requestor to the web service provider to access a web service, and a service requestor identifying information;

determining authentication information from the service request sent to the web service, the service request comprising the authentication information;

validating the authentication information using independently verifiable data; and in response to validating the authentication information meets the independently verifiable data, sending a grant or denial of access to the web service.

9. The system of claim 8, wherein the authentication information comprises an IP address of the service request and the independently verifiable data comprises a range of IP addresses.

10. The system of claim 9, wherein the IP address of the service request is extracted from an x-Forwarded HTTP value.

11. The system of claim 8, wherein the authentication information comprises content of the service request.

12. The system of claim 8, wherein the authentication information includes an attribute of the service request.

13. The system of claim 8, wherein the operations further comprise performing a test on the independently verifiable data.

14. The system of claim 8, wherein the operations further comprise retrieving the independently verifiable data from a secure provisioning repository.

15. A computer readable non-transitory storage medium storing at least one program configured for execution by a computer, the at least one program comprising instructions to perform operations comprising:

receiving an authentication request from a web service provider, the authentication request comprising a service request by a service requestor to the web service provider to access a web service, and a service requestor identifying information;

determining authentication information from the service request sent to the web service, the service request comprising the authentication information;

validating the authentication information using independently verifiable data; and in response to validating the authentication information meets the independently verifiable data, sending a grant or denial of access to the web service.

16. The computer readable non-transitory storage medium of claim 15, wherein the authentication information comprises an IP address of the service request and the independently verifiable data comprises a range of IP addresses.

17. The computer readable non-transitory storage medium of claim 16, wherein the IP address of the service request is extracted from an x-Forwarded HTTP value.

18. The computer readable non-transitory storage medium of claim 15, wherein the authentication information comprises content of the service request.

19. The computer readable non-transitory storage medium of claim 15, wherein the authentication information includes an attribute of the service request.

20. The computer readable non-transitory storage medium of claim 15, wherein the operations further comprise performing a test on the independently verifiable data.

* * * * *